3,409,595
Patented Nov. 5, 1968

3,409,595
THERMOPLASTICALLY PROCESSABLE POLYMERS
Erwin Muller, Leverkusen, Karl Dinges, Cologne-Stammheim, Edmund Hüther, Opladen, and Hans Scheurlen, Leverkusen, Germany, assignors to Farbenfabriken Bayer Aktiengesellschaft, Leverkusen, Germany, a German corporation
No Drawing. Filed Feb. 23, 1965, Ser. No. 434,696
Claims priority, application Germany, Feb. 22, 1964, F 42,100
4 Claims. (Cl. 260—77.5)

ABSTRACT OF THE DISCLOSURE

Thermoplastically processable synthetic resins are the reaction product of an organic polyisocyanate and a polymer having at least one of the following groups present in the side chains: —CO—NH$_2$, —CO—NH—R, —SO$_2$—NH$_2$, —SO$_2$—NH—R, —NH—CO—NH$_2$, —NH—CO—NH—R, —NH—COOR or —CO—NH—CO—R where R is an organic radical, the group being present in an amount from about one to about 20% by weight based on the weight of the polymer.

This invention relates to thermoplastically processable polymers and to a method of preparing the same. More particularly, it relates to polymers that are cross-linked at normal temperatures but which, upon heating, become processable due to the reversability of the cross-linking reaction.

It has been heretofore known to prepare cross-linked synthetic resins from polyisocyanates and polymerization products containing functional groups such as hydroxyl, carboxyl or amino groups. These reaction groups, especially amino and hydroxyl groups, react readily with isocyanates at room temperature. Therefore, mixtures of these reactants have a limited stability, cross-linking occurring prematurely and interfering with subsequent processing of the polymers. When an isocyanate group reacts with the three above-mentioned functional groups, urethane, carbonamide or urea groups are formed and these are relatively thermostable up to about 200° C. In order to reform such cross-linked synthetic resins, temperatures above 200° C. must be employed in order to split the cross-links. At these temperatures, thermal degradation accompanied by decomposition occurs. This results in a sharp decline in the mechanical properties of the cross-linked synthetic resins. Repeated deformations of these products leads to materials which no longer have properties of first grade quality.

It is therefore an object of this invention to provide improved thermoplastically processable synthetic resins. It is another object of this invention to provide an improved method of preparing thermoplastically processable synthetic resins. It is still another object of this invention to provide thermoplastically processable synthetic resins that are cross-linked but which can be repeatedly processed without detrimentally affecting the physical properties. It is a further object of this invention to employ organic polyisocyanates in the preparation of thermoplastically processable synthetic resins.

The foregoing objects and others which will become apparent from the following description are accomplished in accordance with the invention, generally speaking, by providing thermoplastically processable synthetic resins by reacting an organic polyisocyanate with long chain polymers having at least one of the following groups present in side chains —CO—NH$_2$, —CO—NH—R, —SO$_2$—NH$_2$,
—SO$_2$—NH—R, —NH—CO—NH$_2$,
—NH—CO—NH—R, —NH—COOR— or

—CO—NH—CO—R where R is an organic radical, in an amount of from about one to about 20% by weight based on the weight of the molecule. More particularly, the invention is concerned with copolymers having a carbon to carbon chain wherein at least one of the above-mentioned groups is present in the side chain in the amount specified which groups are reacted with organic polyisocyanates to produce cross-linked structures. Preferably, R is alkyl, cycloalkyl, aralkyl or aryl.

The reactive groups set forth above differ from the hydroxyl, carboxyl or amino groups mentioned above in that they begin to react with isocyanates only at temperatures above 80° C. It is therefore possible to prepare stable mixtures of these polymers with polyisocyanates without the added concern of premature cross-linking occurring. This is true even though the components are being combined on mixing rollers such as customarily used in the rubber industry. Generally, the reaction between the polymerization products and the polyisocyanate takes place above 100° C. and most commonly, between 100 and 120° C. The reaction produces either acyl urea, biuret or allophonate cross-links. These groups differ from the urethane, carbonamide or urea groups formed by reaction with hydroxyl, carboxyl or amino groups respectively in that they split off into the original components at temperatures of from about 130 to about 180° C. Thus, the reaction between the subsequent linear copolymer and the cross-linked synthetic resin is in equilibrium between these temperatures and can be processed as a thermoplastic. After the material is deformed in the desired shape, the equilibrium shifts, on cooling, in the direction of the reformation of the cross-linking groups. This equilibrium and splitting mechanism permits the production of cross-linked synthetic resins by thermoplastic techniques. Generally, below about 120° C., the properties of these products correspond to those of the cross-linked synthetic resin while above this temperature they correspond to those of a thermoplast.

Any suitable polymer having a preferred molecular weight of from 50,000 to 200,000 containing from about one to about 20% by weight of at least one of the groups set forth in the side chains or as pendant groups may be used in the process of this invention. In most instances, the main polymer chain will be a long chain aliphatic polymer composed of carbon to carbon bonds. The groups set forth generally will be randomly distributed throughout the aliphatic chain. Suitable compounds are prepared by the copolymerization of various compounds, preferably monomers, with polymerizable monomers containing the required groups. Any polymerizable monomer containing one of the aforesaid groups or a mixture of said polymerizable monomers may be used such as, for example,

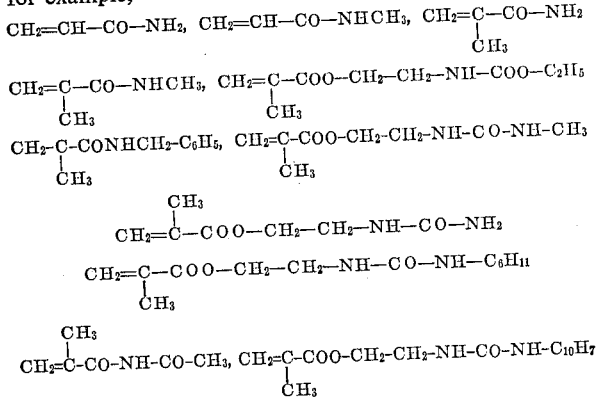

Preferred compounds are acrylamide and methacrylamide. Any suitable copolymerizable compound containing ethelenically unsaturated bonds may be used such as, for example, styrene, acrylonitrile, acrylic acid, methacylate, ethylacrylate, proplacrylate, butylacrylate, 2-ethylhexylacrylate, cyclohexylacryate, the corresponding methacryic acid esters, methacrylonitrile, butadiene, isoprene, vinyl toluene, alpha-methyl styrene, vinyl chloride, vinyl acetate, graft polymers of acrylic esters and methacrylic esters on polybutadiene, polyamyl esters and the like. The polymerizable compound containing one of the aforesaid groupings should be present in an amount such that the groupings are present in a quantity of from about one to 20% by weight. Preferred polymers are the copolymers of styrene with acrylonitrile and for acrylic esters such as butyl acrylate.

It is also possible to use copolymers of styrene and acrylonitrile in which some of the nitrile groups are already converted into carbonamide groups under the polymerization conditions so that they can be used for the reaction with isocyanates without the addition of the above mentioned monomers which contain functional groups. Graft polymers obtained, for example, by grafting styrene or acrylonitriles or one of the components containing functional groups on to prepolymerized butadiene polymers or copolymers are also suitable for the reaction with polyisocyanates.

Polymers of ethylene or its copolymers, for example, with propylene or vinyl acetate, which contain —SO$_2$, —NH$_2$ or —SO$_2$—NHR groups (where R is, for example, methyl, ethyl, propyl, butyl) as a result of sulphochlorination followed by amidation, may also be used.

Polymers which contain hydroxyl groups which are converted into urethan groups by reaction with monoisocyanates or by reaction with phosgene via chlorocarbonic acid ester and reaction thereof with ammonia or amines are suitable for the present process. Partly saponified or saponified ethylene-vinyl acetate copolymers in particular are to be mentioned as examples of polymers which contain hydroxyl groups. Also suitable are polyvinyl alcohol polymers and copolymers thereof with other olefins.

Any suitable organic polyisocyanate may be used in the process of this invention such as, for example, tetramethylene diisocyanate,
hexamethylene diisocyanate,
1,4-phenylene diisocyanate,
1,3-phenylene diisocyanate,
1,4-cyclohexylene diisocyanate,
2,4-tolylene diisocyanate,
2,5-tolylene diisocyanate,
2,6-tolylene diisocyanate,
3,5-tolylene diisocyanate,
4-chloro-1,3-phenylene diisocyanate,
1-methoxy-2,4-phenylene diisocyanate,
1-methyl-3,5-diethyl-2,6-phenylene diisocyanate,
1,3,5-triethyl-2,4-phenylene diisocyanate,
1-methyl-3,5-diethyl-2,4-phenylene diisocyanate,
1-methyl-3,5-diethyl-6-chloro-2,4-phenylene diisocyanate,
6-methyl-2,4-diethyl-5-nitro-1,3-phenylene diisocyanate,
p-xylylene diisocyanate,
m-xylylene diisocyanate,
4,6-dimethyl-1,3-xylylene diisocyanate,
1,3-dimethyl-4,6-bis(β-isocyanatoethyl)benzene,
3-(α-isocyanatoethyl) phenylisocyanate,
1-methyl-2,4-cyclohexylene diisocyanate,
4,4'-biphenylene diisocyanate,
3,3'-dimethyl-4,4'-biphenylene diisocyanate,
3,3'-dimethoxy-4,4'-biphenylene diisocyanate,
3,3'-diethoxy-4,4'-diphenylene diisocyanate,
1,1'-bis-(4-isocayanatophenyl)cyclohexane,
4,4'-diisocyanatodiphenylether,
4,4'-diisocayanator-dicyclohexylmethane,
4,4'-diisocyanato-diphenylmethane,
4,4'-diisocyanator-3,3'-dimethyldiphenylmethane,
4,4-diisocyanato-3,3'-dichlorodiphenylmethane,
4,4'-diisocyanato-diphenyl-dimethylmethane,
1,5-naphthylene diisocyanate,
4,4',4"-triisocyanato-triphenylmethane,
2,4,4'-triisocyanato-diphenylether,
2,4,6-triisocyanator-1-methyl-3,5-diethylbenzene,
o-tolidine-4,4'-diisocyanate,
m-tolidine-4,4'-diisocyanate,
benzophenone-4,4'-diisocyanate,
dimeric toluylene diisocyanate, urethane containing polyisocyanates obtained, for example, by reacting one mol of trimethylolpropane with 3 mols of toluylene diisocyanate, biuret groups containing polyisocyanate, such as those prepared by reacting any of the above mentioned isocyanates with water, triisocyanatotriphenylthiophosphate and the like.

The polyisocyanate is generally used in an amount substantially equivalent to the reactive hydrogen atoms present. Occasionally, it may be desirable to use less than an equivalent amount of polyisocyanate. An excess of polyisocyanate is not generally desired, however, it may be if the products contain small percentages of water. Mixing of the polymer and the isocyanate is preferably carried out on mixing rollers similar to that used in the rubber industry, in a Banbury mixer or the like. The reaction together with shaping is conducted under pressure by suitable thermoplastic techniques such as compression molding, extrusion or the like, at elevated temperatures, preferably between about 120° and 150° C. depending upon the starting material used.

The physical properties of the products of the process are largely determined by the composition of the polymer and its content of monomers having functional groups. The higher the content of monomers with functional groups, the higher is also the degree of cross-linking to be expected. It is found to be advantageous to react the polymer with a quantity of polyisocyanate corresponding approximately to the functional groups. However, it is also possible to work with less than equivalent or excess amounts of polyisocyanate, depending on the degree of cross-linking desired. Coplymers of styrene and acrylonitrile, which in themselves already contain carbonamide groups or have been obtained by copolymerization with 3 to 5% methacrylamide, are converted into cross-linked synthetic resins of high heat resistance, solvent resistance and bending strength after mixing them with polyisocyanates and shaping them at elevated temperatures Copolymers of butadiene, isoprene with styrene, acrylonitrile and one of the components according to the invention with functional groups give rise to cross-linked elastomers which, in contrast to the sulphur vulcanizates, can be shaped repeatedly at elevated temperatures. The process therefore enables the production of many different kinds of cross-linked thermoplastically deformable synthetic resins which differ from the synthetic resins obtained by the poly-addition process also by their greater resistance to hydrolysis.

The invention is further illustrated but not limited by the following examples in which parts are by weight unless otherwise specified.

Example 1

About 100 parts of a copolymer of styrene, methacrylamide and butyl acrylate (proportions 60:5:35) are mixed on a hot roller at about 140° C. with about 14.7 parts of diphenylmethane-4,4′-diisocyanate. It is observed that the sheet which is at first very sticky readily separates from the roller after addition of the diisocyanates. Plates are made from the roller sheet by compression at about 170° C. and test samples are taken from these plates. When the compressed material is again treated on the rollers at about 140° C., a perfectly satisfactory sheet is again obtained which can be again compressed to a homogeneous plate without any difficulty. The values obtained from the tests (Table I) and repeated thermoplastic deformation show that the cross-linkages produced by the reaction of the diisocyanate can be reversibly split at elevated temperatures.

Example 4

In the following experiments, products of different hardness and strength were prepared by mixing a hard, brittle copolymer A of about 72% styrene, about 23% acrylonitrile, about 5% methacrylamide with a soft copolymer B consisting of about 50% styrene, about 45% butyl acrylate, about 5% methacrylamide with simultaneous reversible cross-linking with diphenylmethane-4,4′-diisocyanate. Components A and B are mixed with the diisocyanate on a roller heated to about 150° C. and granulated and standard test rods are then prepared by extrusion at about 200° C. Some of the extruded material is ground up and extruded a second time under the same conditions.

Mixture 1 (comparison):                                   Parts
   Copolymer A _____ 150
   Copolymer B _____ 50
Mixture 2:
   Copolymer A _____ 150
   Copolymer B _____ 50
   Diphenylmethane-4,4′-diisocyanate _____ 7.36

TABLE I

| | Bending strength, kp./cm.$^2$ | Ball pressure hardness, kp./cm.$^2$ | Martens heat resistance, ° C. | Reaction to boiling cyclohexanone |
|---|---|---|---|---|
| Copolymer with diisocyanate | 538 | 825/720 | 45 | Very strong swelling. |
| Copolymer with diisocyanate (compressed once) | 620 | 1,080/965 | 53 | Slight swelling. |
| Copolymer with diisocyanate (compressed twice) | 625 | 1,100/980 | 55 | Do. |

Preparation of the copolymer as starting material

The solution of about 0.6 kg. of an alkyl sulphonate (containing 14 to 16 C-atoms) and of about 0.5 kg. methacrylamide free from stabilizer in about 15 kg. desalted water is placed in a 40 litre autoclave with stirrer. After heating to about 60° C., about 6 kg. styrene (distilled, free from stabilizer) and about 3.5 kg. butyl acrylate (free from stabilizer) are added and the mixture then activated with about 10 g. potassium persulphate. Polymerization is finished after about 6 hours. An approximately 38 to 40% latex is obtained which is precipitated with 2% CaCl$_2$. The polymer is dried in a vacuum drying cupboard at about 60° C.

Mixture 3 (comparison):                                   Parts
   Copolymer A _____ 100
   Copolymer B _____ 100
Mixture 4:
   Copolymer A _____ 100
   Copolymer B _____ 100
   Diphenylmethane-4,4′-diisocyanate _____ 7.35
Mixture 5 (comparison):
   Copolymer A _____ 50
   Copolymer B _____ 150

TABLE II

| | Tensile strength, kp./cm.$^2$ | Elongation at break, percent | Bending strength, kp./cm.$^2$ | Ball pressure hardness, kp./cm.$^2$ | Reaction to boiling cyclohexanone |
|---|---|---|---|---|---|
| Copolymer mixture without isocyanate | 177 | 362 | 167 | 362/252 | Soluble. |
| Copolymer mixture with diisocyanate compressed once | 244 | 168 | 247 | 425/318 | Slightly swelled. |
| Copolymer mixture with diisocyanate compressed twice | 250 | 157 | 262 | 441/330 | Do. |

Example 3

Proceeding as in Example 2, but replacing about 7 parts of diphenylmethane-4,4′-diisocyanate by about 4.9 parts of dimeric toluylene diisocyanate, cross-linked products are obtained which can be worked up repeatedly and which have the following properties:

Mixture 6:                                                Parts
   Copolymer A _____ 50
   Copolymer B _____ 150
   Diphenylmethane-4,4′-diisocyanate _____ 7.35

TABLE III

| | Tensile strength, kp./cm.$^2$ | Elongation at break, percent | Bending strength, kp./cm.$^2$ | Ball pressure hardness, kp./cm.$^2$ | Reaction to boiling cyclohexanone |
|---|---|---|---|---|---|
| Copolymer mixture without diisocyanate | 177 | 362 | 167 | 362/252 | Soluble. |
| Copolymer mixture with diisocyanate compressed once | 215 | 144 | 222 | 390/311 | Slightly swelled. |
| Copolymer mixture with diisocyanate compressed twice | 223 | 135 | 210 | 405/322 | Do. |

The following table shows the properties of the test samples obtained from the above mixtures.

TABLE IV

| | Tensile strength, kp./cm.² | Elongation at break, percent | Bending strength, kp./cm.² | Ball pressure hardness, kp./cm.² | Martens heat resistance, °C. | Reaction to boiling cyclohexanone |
|---|---|---|---|---|---|---|
| Mixture 1 | 452 | 15 | 757 | 1,250/1,110 | 83 | Soluble. |
| Mixture 2 extruded once | 508 | 10 | 917 | 1,265/1,180 | 90 | Swells. |
| Mixture 2 extruded twice | 515 | 10 | 922 | 1,298/1,203 | 90 | Do. |
| Mixture 3 | 343 | 32 | 382 | 765/635 | 31 | Soluble. |
| Mixture 4 extruded once | 448 | 23 | 648 | 915/775 | 42 | Swells. |
| Mixture 4 extruded twice | 437 | 22 | 655 | 932/797 | 43 | Do. |
| Mixture 5 | 247 | 154 | 200 | 445/328 | | Soluble. |
| Mixture 6 extruded once | 344 | 23 | 361 | 680/560 | 31 | Swells. |
| Mixture 6 extruded twice | 352 | 25 | 377 | 688/568 | 32 | Do. |

Preparation of the copolymer as starting material

The solution of about 25 g. of the sodium salt of a disproportioned abietic acid in about 6 liters of water is placed in an autoclave equipped with stirrer and feed vessels. About 6 cc. NaOH are run into the autoclave and the mixture is then heated to about 60° C. and about 1 kg. of the monomer mixture A composed of about 7.2 kg. styrene, about 2.3 kg. acrylonitrile and about 35 g. tertiary dodecylmercaptan is added. The reaction mixture is then activated with about 30 g. potassium persulphate. The remainder of the monomer mixture A is run in the course of 4 hours. During the same time, the monomer mixture B composed of about 5.85 liters of water, about 0.5 kg. methacrylamide, about 300 g. of the sodium salt of a disproportioned abietic acid and about 14.4 g. NaOH is run in. A 45% to 46% latex is thereby obtained which is precipitated with 2% CaCl₂ solution. The polymer is then dried in a vacuum drying cupboard.

It is of course to be understood that any compound containing any of the groups set forth, in the side chain and any organic isocyanate can be used in place of those specifically used in the above examples.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A thermoplastically processable synthetic resin which comprises the reaction product of (1) an organic polyisocyanate selected from the group consisting of aliphatic polyisocyanates, araliphatic polyisocyanates, cycloaliphatic polyisocyanates and aromatic polyisocyanates and (2) a polymer having a grouping selected from the class consisting of —CO—NH₂, —CO—NH—R, —SO—NH₂, —SO₂—NH—R, —NH—CO—NH₂,

—NH—CO—NH—R

—NH—COOR and —CO—NH—CO—R where R is an organic radical free of groups reactive with isocyanate groups and selected from the group consisting of alkyl radicals, cycloalkyl radicals, aralkyl radicals and aryl radicals, said group being present in the side chains of said polymer in an amount of from about one to 20% by weight based on the weight of the polymer, said organic polyisocyanate being used in an amount less than or substantially equivalent to the reactive hydrogen atoms present in the polymer.

2. A thermoplastically processable synthetic resin which comprises the reaction product of (1) an organic polyisocyanate selected from the group consisting of aliphatic polyisocyanates, araliphaticpoly isocyanates, cycloaliphatic polyisocyanates and aromatic polyisocyanates and (2) a polyolefin having from about one to about 20% by weight based on the weight of the polymer of a group selected from the class consisting of —CO—NH₂,

—CO—NH—R,

—SO—NH₂, —SO₂—NH—R, —NH—CO—NH₂

—NH—CO—NH—R, —NH—COOR and

—CO—NH—CO—R where R is a member free of groups reactive with isocyanate groups and selected from the group consisting of alkyl, cycloalkyl, aralkyl and aryl, said group being present in the side chains of said polymer said organic polyisocyanate (1) being used in an amount less than or substantially equivalent to the reactive hydrogen atoms present in the polyolefin (2).

3. A thermoplastically processable synthetic resin, which comprises the reaction product of an organic polyisocyanate selected from the group consisting of aliphatic polyisocyanates, araliphatic polyisocyanates, cycloaliphatic polyisocyanates and aromatic polyisocyanates and a copolymer of an ethylenically unsaturated monomer and methacrylamide, said methacrylamide being present in said copolymer in an amount such that the —CONH₂ groups are present in an amount of from about 1% to 20% by weight based on the weight of the said copolymer said organic polyisocyanate being used in an amount less than or substantially equivalent to the reactive hydrogen atoms present in the copolymer.

4. The thermoplastically processable synthetic resin of claim 1 wherein R is methyl, benzyl, cyclohexyl, ethyl or naphthyl.

No references cited.

JOSEPH L. SCHOFER, *Primary Examiner.*

S. M. LEVIN, *Assistant Examiner.*